(12) United States Patent
Juan et al.

(10) Patent No.: US 8,094,677 B2
(45) Date of Patent: Jan. 10, 2012

(54) MULTI-BUS STRUCTURE FOR OPTIMIZING SYSTEM PERFORMANCE OF A SERIAL BUFFER

(75) Inventors: Steve Juan, Fremont, CA (US); Chi-Lie Wang, Milpitas, CA (US); Ming-Shiung Chen, Cupertino, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 801 days.

(21) Appl. No.: 11/679,824

(22) Filed: Feb. 27, 2007

(65) Prior Publication Data
US 2008/0205438 A1  Aug. 28, 2008

(51) Int. Cl.
*H04J 3/16* (2006.01)
(52) U.S. Cl. .......... 370/465; 370/235; 370/413; 710/27; 710/107; 710/305
(58) Field of Classification Search .............. 370/349, 370/412, 413, 417, 465, 229, 252, 395.42, 370/415, 394; 710/12, 27, 52, 107, 112, 710/305; 711/213; 709/232; 375/240.26
See application file for complete search history.

(56) References Cited

U.S. PATENT DOCUMENTS

| | | | |
|---|---|---|---|
| 4,090,238 A | 5/1978 | Russo | |
| 4,438,489 A | 3/1984 | Heinrich et al. | |
| 4,768,149 A | 8/1988 | Konopik et al. | |
| 5,202,964 A | 4/1993 | Crouch | |
| 5,530,902 A | 6/1996 | McRoberts et al. | |
| 5,578,953 A | 11/1996 | Nuckols | |
| 5,608,873 A | 3/1997 | Feemster et al. | |
| 5,682,480 A | 10/1997 | Nakagawa | |
| 5,737,547 A * | 4/1998 | Zuravleff et al. | 710/112 |
| 5,850,399 A * | 12/1998 | Ganmukhi et al. | 370/412 |
| 5,905,913 A | 5/1999 | Garrett et al. | |
| 5,991,304 A * | 11/1999 | Abramson | 370/413 |
| 5,991,817 A | 11/1999 | Rowett et al. | |
| 6,070,219 A | 5/2000 | McAlpine et al. | |
| 6,145,007 A | 11/2000 | Dokic et al. | |
| 6,189,049 B1 | 2/2001 | Klein | |
| 6,222,846 B1 | 4/2001 | Bonola et al. | |
| 6,393,507 B2 | 5/2002 | Klein | |
| 6,401,142 B1 * | 6/2002 | Williams et al. | 710/14 |
| 6,546,482 B1 | 4/2003 | Magro et al. | |
| 6,665,872 B1 * | 12/2003 | Krishnamurthy et al. | 725/95 |
| 6,920,146 B1 * | 7/2005 | Johnson et al. | 370/415 |
| 6,954,811 B2 | 10/2005 | Vishnu | |

(Continued)

FOREIGN PATENT DOCUMENTS
DE  101 55 486  5/2003

*Primary Examiner* — Aung S Moe
*Assistant Examiner* — Vincelas Louis
(74) *Attorney, Agent, or Firm* — Bever, Hoffman & Harms LLP

(57) ABSTRACT

A serial buffer having a parser and multiple parallel processing paths is provided. The parser receives incoming packets, determines the type of each packet, and then routes each packet to a processing path that corresponds with the determined packet type. Packet types may include blocking priority packets (which implement bus slave operations), non-blocking priority packets (which access on-chip resources of the serial buffer) and data packets (which implement bus master operations). Because the different packet types are processed on parallel processing paths, the processing of one packet type does not interfere with the processing of other packet types. As a result, blocking conditions within the serial buffer are minimized.

19 Claims, 1 Drawing Sheet

U.S. PATENT DOCUMENTS

| | | |
|---|---|---|
| 7,016,352 B1 * | 3/2006 | Chow et al. .................. 370/392 |
| 7,154,902 B1 | 12/2006 | Sikdar |
| 7,209,137 B2 | 4/2007 | Brokenshire et al. |
| 7,313,670 B2 * | 12/2007 | Matsushita .................. 711/213 |
| 7,353,360 B1 * | 4/2008 | Muller et al. ................ 711/203 |
| 7,369,078 B2 | 5/2008 | Nickel et al. |
| 7,395,362 B2 | 7/2008 | Drexler et al. |
| 7,433,363 B2 | 10/2008 | Rosen et al. |
| 7,433,985 B2 | 10/2008 | Ayyar et al. |
| 7,548,586 B1 * | 6/2009 | Mimar .................... 375/240.26 |
| 7,701,949 B1 * | 4/2010 | Rose et al. ............... 370/395.42 |
| 7,870,313 B2 * | 1/2011 | Wang et al. .................... 710/52 |
| 2002/0161959 A1 * | 10/2002 | Apostol et al. ................ 710/305 |
| 2002/0165897 A1 | 11/2002 | Kagan et al. |
| 2003/0061431 A1 | 3/2003 | Mears et al. |
| 2003/0095536 A1 * | 5/2003 | Hu et al. ...................... 370/349 |
| 2003/0097460 A1 * | 5/2003 | Higashiyama et al. ....... 709/232 |
| 2004/0123175 A1 | 6/2004 | Roth et al. |
| 2004/0266267 A1 | 12/2004 | Inaba |
| 2005/0015529 A1 | 1/2005 | Jung et al. |
| 2005/0138246 A1 | 6/2005 | Chen et al. |
| 2005/0249115 A1 * | 11/2005 | Toda et al. ..................... 370/229 |
| 2005/0273540 A1 | 12/2005 | Whaley |
| 2006/0039370 A1 | 2/2006 | Rosen et al. |
| 2006/0168384 A1 | 7/2006 | Radhakrishnan et al. |
| 2006/0248376 A1 | 11/2006 | Tezcan et al. |
| 2006/0248377 A1 | 11/2006 | Tezcan et al. |
| 2007/0162642 A1 | 7/2007 | Tousek |
| 2007/0230495 A1 | 10/2007 | Li |
| 2008/0019371 A1 * | 1/2008 | Anschutz et al. ............. 370/394 |
| 2008/0205422 A1 * | 8/2008 | Wang et al. ................... 370/412 |
| 2008/0209089 A1 | 8/2008 | Mo et al. |
| 2010/0014440 A1 * | 1/2010 | Yazaki et al. ................. 370/252 |

* cited by examiner

MULTI-BUS STRUCTURE FOR OPTIMIZING SYSTEM PERFORMANCE OF A SERIAL BUFFER

RELATED APPLICATIONS

The present application is related to the following commonly-owned, co-filed U.S. patent applications, which are hereby incorporated by reference in their entirety:

U.S. patent application Ser. No. 11/679,813 "PACKET-BASED PARALLEL INTERFACE PROTOCOL FOR A SERIAL BUFFER HAVING A PARALLEL PROCESSOR PORT", by Jason Z. Mo and Stanley Hronik.

U.S. patent application Ser. No. 11/679,817 "METHOD AND STRUCTURE TO SUPPORT SYSTEM RESOURCE ACCESS OF A SERIAL DEVICE IMPLEMENTING A LITE-WEIGHT PROTOCOL", by Chi-Lie Wang, Jason Z. Mo and Calvin Nguyen.

U.S. patent application Ser. No. 11/679,820 "HARDWARE-BASED CONCURRENT DIRECT MEMORY ACCESS (DMA) ENGINES ON SERIAL RAPID INPUT/OUTPUT SRIO INTERFACE", by Chi-Lie Wang and Bertan Tezcan.

U.S. patent application Ser. No. 11/679,823 "RAPID INPUT/OUTPUT DOORBELL COALESCING TO MINIMIZE CPU UTILIZATION AND REDUCE SYSTEM INTERRUPT LATENCY", by Chi-Lie Wang, Kwong Hou ("Ricky") Mak and Jason Z. Mo.

BACKGROUND OF THE INVENTION

1. Field of the Invention

The present invention relates to a high speed serial buffer. More specifically, the present invention relates to a method and structure for improving system performance of a high speed serial buffer.

2. Related Art

Conventional serial buffers implement one or more serial ports using an advanced interface protocol, such as the serialized rapid input/output (sRIO) protocol, or a Lite-weight protocol, such as SerialLite (as specified by FPGA maker Altera) or Aurora (as specified by FPGA maker Xilinx).

Conventional serial buffers include various on-chip resources, such as a buffer memory, configuration registers and flag/error registers. The buffer memory typically facilitates data transfer through the serial buffer, while the configuration registers and flag/error registers typically control the operation of the serial buffer. Different types of incoming packets are provided to the serial port of the serial buffer to access these different on-chip resources. A conventional serial buffer includes a single buffer for receiving and storing all of these different types of packets. However, some types of packets may require longer processing times than other types of packets within the serial buffer. For example, a relatively long processing time may be associated with a packet that requests read data from the buffer memory of the serial buffer, while a relatively short processing time may be associated with a packet that accesses a configuration register of the serial buffer. It is possible for packets having relatively long associated processing times to block subsequently received packets having relatively short associated processing times. In this case, the serial buffer must wait until the packets having relatively long processing times have been processed before processing the packets having relatively short processing times. System performance of the serial buffer is degraded when such a blocking condition is encountered.

It would therefore be desirable to have a serial buffer that eliminates the above-described blocking conditions.

SUMMARY

Accordingly, the present invention provides a serial buffer having a parser which receives incoming packets, determines a type of each packet, and then routes the packet to one of a plurality of buses, which has been established to receive packets of the determined type. In a particular embodiment, a parser selectively routes each received packet on one of three internal buses of the serial buffer. In this embodiment, the packets are categorized into three types, including blocking priority packets, non-blocking priority packets and data packets.

The blocking priority packets cause data to be retrieved from the buffer memory (i.e., queues) of the serial buffer, and typically have relatively long processing times. The data packets are written to the buffer memory of the serial buffer, and also typically have relatively long processing times. In a conventional serial buffer, the blocking priority packets and/or the data packets could potentially block the accesses associated with subsequently received packets.

The non-blocking priority packets access the configuration registers of the serial buffer, and typically have relatively short processing times. The non-blocking priority packets typically do not block the accesses associated with subsequently received packets in a conventional serial buffer.

The parser routes blocking priority packets, non-blocking priority packets and data packets on a blocking priority packet bus, a non-blocking priority packet bus and a data packet bus, respectively. The three different packet types are stored in three different corresponding packet buffers on the serial buffer, and are processed on three parallel paths within the serial buffer. As a result, none of the three different packet types blocks either of the two other packet types. That is, in the serial buffer of the present invention, blocking priority packets can only block subsequently received blocking priority packets, but not data packets or non-blocking priority packets.

The present invention will be more fully understood in view of the following description and drawing.

DETAILED DESCRIPTION

Figure 1:
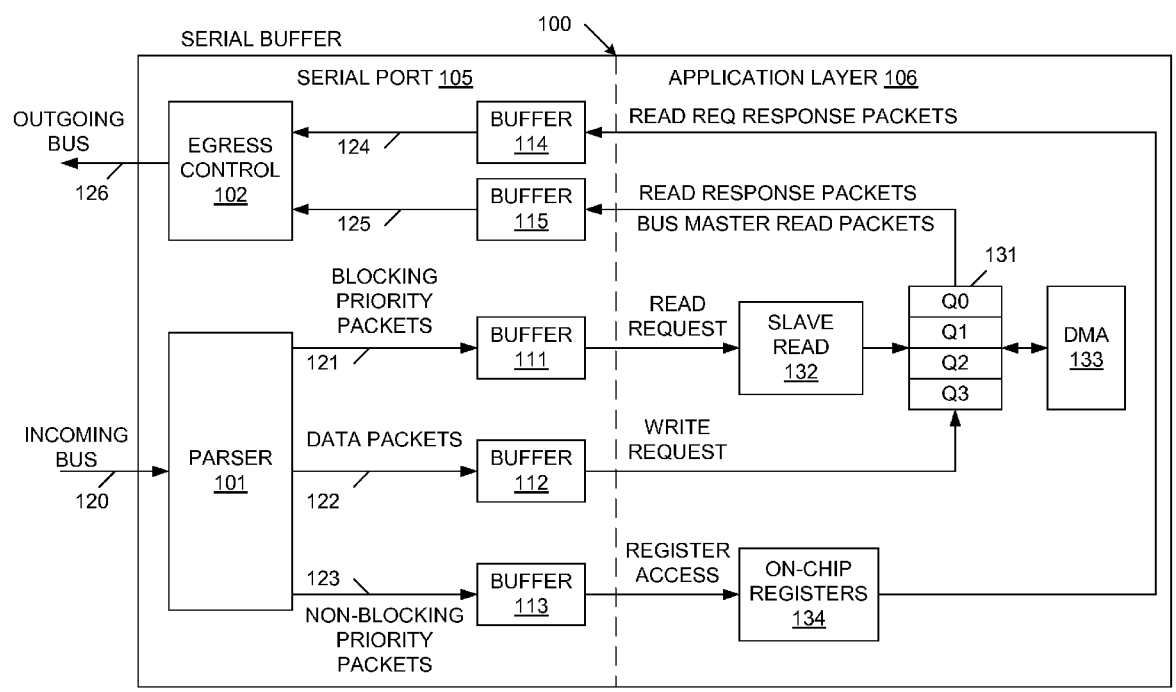
FIG. 1 is a block diagram of a serial buffer that implements a plurality of buses for carrying different packet types.

FIG. 1 is a block diagram of a serial buffer 100 that separates incoming packets based on the attributes of the packets, and routes and processes the separated packets on separate paths. In the described embodiment, serial buffer 100 includes a serial port 105 and an application layer 106. Serial port 105 includes parser 101, egress controller 102, packet buffers 111-115 and packet buses 120-126. Application layer 106 includes queue block 131, slave read block 132, DMA engine 133 and on-chip registers 134. Queue block 131 includes four queues Q0-Q3, each having a dedicated read port and a dedicated write port. The four queues Q0-Q3 are assigned different priorities. In the described embodiments, queue Q0 has the highest priority, followed in order of decreasing priority by queues Q1, Q2 and Q3. Although the present invention is described in connection with four queues, it is understood that other numbers of queues can be used in other embodiments. Also, even though queue block 131 is illustrated as being included on serial buffer 100, it is understood that queue block 131 can be implemented on a separate chip, external to serial buffer 100, in other embodiments.

Parser 101 of serial port 105 is configured to receive incoming packets on bus 120. In accordance with various embodiments of the present invention, the incoming packets may be formatted in accordance with a serialized rapid input output (sRIO) protocol or a Lite-weight protocol. Parser 101 monitors the incoming packets, and in response, separates these packets into three separate sets, based on the packet attributes. For example, packets may be separated based on the time required to process the packet and/or packet priority. Packets may alternately be separated based on packet type (e.g., received data packets, packets requesting slave read operations from a selected queue, and packets requesting register read/write accesses). The separated packets are selectively routed onto dedicated buses 121-123, and stored in packet buffers 111-113 in the manner described below. Although the described embodiments separate the incoming packets into three separate sets, it is understood that in other embodiments, the incoming packets may be separated into other numbers of sets. The number of sets should be selected in view of the types of packets received as well as the processing associated with these packets.

In the described examples, parser 101 separates the incoming packets as follows. Parser 101 monitors the header of each incoming packet to identify a packet type associated with the packet. In the described embodiments, parser 101 categorizes each incoming packet as one of three different types. More specifically, parser 101 categorizes each incoming packet as: (1) a blocking priority packet, (2) a data packet, or (3) a non-blocking priority packet. Parser 101 routes blocking priority packets on bus 121, data packets on bus 122, and non-blocking priority packets on bus 123.

Blocking priority packets will now be described. If serial port 105 implements an sRIO protocol, the blocking priority packets may include NREAD packets and/or doorbell frame request packets. If serial port 105 implements a Lite-weight protocol, the blocking priority packets may include Lite frame request packets. Thus, in the described examples, the blocking priority packets implement read requests, which typically require a relatively long processing time.

Parser 101 routes the blocking priority packets to buffer 111 on the packet bus 121. The blocking priority packets are routed to application layer 106 where these packets are handled as read requests. Within application layer 106, slave read block 132 initiates a read access to a selected queue within queue block 131, thereby reading the top packet from the selected queue. The queue is selected in response to information in the received blocking priority packet. More specifically, the queue is selected by matching a destination ID in the header of the blocking priority packet to a source ID stored in a source ID register associated with the selected queue. The packet read from the selected queue of queue block 131 is provided to output packet buffer 115 as a read response packet. Packet buffer 115, in turn, routes received read response packets to egress controller 102 on packet bus 125. Egress controller 102 transmits read response packets on outgoing bus 126 in a manner described in more detail below. In the foregoing manner, serial buffer 100 operates as a bus slave during the processing of blocking priority packets.

Data packets will now be described. In general, a data packet is allowed to block subsequently received data packets, but not blocking priority packets or non-blocking priority packets. If serial port 105 implements an sRIO protocol, the data packets may include conventional SWRITE, NWRITE and/or NWRITE_R packets. If serial port 105 implements a Lite-weight protocol, the data packets may include conventional DATA packets. Thus, in the described examples, the data packets implement write requests, which can require a relatively long processing time.

Parser 101 routes the received data packets to buffer 112 on the packet bus 122. The data packets are routed to application layer 106 where these packets are handled as write requests. Within application layer 106, a selected queue within queue block 131 receives and stores the incoming data packets. The queue is selected in response to information in the received data packet. More specifically, the queue is selected by matching a destination ID in the header of the data packet with a destination ID stored in a destination ID register associated with the selected queue. Because each of the queues Q0-Q3 has separate read and write ports, the data packets may be written to these queues Q0-Q3, without interfering with read accesses of these queues Q0-Q3. This separate processing path allows data packets to be downloaded at full wire speed, without interference from blocking priority packets or non-blocking priority packets.

In accordance with one embodiment, each of the queues in queue block 131 may operate as a bus master when data (e.g., a data packet) written to a queue causes the water level of the queue to exceed a watermark of the queue (i.e., when the queue exceeds a predetermined level of fullness). Under these conditions, DMA engine 133 causes packets to be read from the top of the queue until the water level of the queue no longer exceeds the watermark of the queue. This operation is described in more detail in commonly owned, co-filed U.S. patent application Ser. No. 11/679,820, which is hereby incorporated by reference in its entirety. The packets read from a queue while the queue is configured as a bus master are hereinafter referred to as bus master read packets. The bus master read packets read from each of the queues are stored in output packet buffer 115. Thus, output packet buffer 115 is configured to receive both read response packets and bus master read packets from queues Q0-Q3.

It is possible that one of the queues Q0-Q3 may be configured to provide a read response packet (as a bus slave) at the same time that another one of the queues Q0-Q3 is configured to provide a bus master read packet (as a bus master). In this case, where a plurality of queues Q0-Q3 are concurrently active to provide read packets, the queues Q0-Q3 are serviced in order of priority (highest first). Thus, if a blocking priority packet requests that a read response packet be provided by a low priority queue, and a higher priority queue is configured as a bus master to provide a bus master read packet to buffer 115, then the read response packet requested by the blocking priority packet will be blocked until the bus master completes the transfer from the higher priority queue. While this blocking condition exists, additional blocking priority packets are prevented from accessing the low priority queue. However, this blocking condition will not impede the processing of data packets or non-blocking priority packets, because the data packets and non-blocking priority packets are processed on parallel paths.

Conversely, if a blocking priority packet requests that a read response packet be provided by a high priority queue, and a lower priority queue is configured as a bus master to provide a bus master read packet to buffer 115, then the bus master read packet will be blocked until the read response packet has been transferred from the higher priority queue. However, this blocking condition will not impede the processing of blocking priority packets or non-blocking priority packets, because the blocking priority packets and non-blocking priority packets are processed on parallel paths. Moreover, additional data packets can be written to the low priority queue, unless this queue is (or becomes) full.

Non-blocking priority packets will now be described. In general, non-blocking priority packets are processed so quickly that sequential non-blocking priority packets will not cause blocking conditions. If serial port 105 implements an sRIO protocol, the non-blocking priority packets may include maintenance read and write request packets. If serial port 105 implements a Lite-weight protocol, the non-blocking priority packets may include configuration read and write request packets. Thus, in the described examples, the non-blocking priority packets implement accesses to internal registers of serial buffer 100, which typically require a relatively short processing time. Note that the processing of non-blocking priority packets takes a relatively short time because all processing occurs on serial buffer 100, and the data width is relatively short.

Parser 101 routes the non-blocking priority packets to buffer 113 on the packet bus 123. The non-blocking priority packets are routed from packet buffer 113 to application layer 106, where these packets are handled as register access requests. Within application layer 106, these packets may write data to (or read data from) on-chip registers 134. If a non-blocking priority packet specifies a write access, write data associated with the non-blocking priority packet is written to the on-chip register specified by the non-blocking priority packet. If a non-blocking priority packet specifies a read request, data is read from the on-chip register specified by the non-blocking priority packet, and routed to packet buffer 114 as a read request response packet. Packet buffer 114, in turn, routes the read request response packets to egress controller 102 on packet bus 124. Egress controller 102 routes the packets provided by output packet buffers 114 and 115 based on the assigned priority of these packets. For example, when using an sRIO protocol, each packet is assigned a priority level from 0 to 3. Egress controller 102 monitors the priority of the packets stored in packet buffers 114-115, and immediately routes the highest priority packets present in buffers 114-115. The packets routed by egress controller 102 are provided on outgoing bus 126.

Assigning the highest priority to only a particular packet type (e.g., non-blocking priority packets) would prevent packets of this particular type from being blocked by other the packet types. In this manner, the performance of serial buffer 100 may be improved.

In the manner described above, serial buffer 100 advantageously allows separate control plane and data plane operations to prevent deadlock, starvation and head of line blocking of the queues Q0-Q3 of serial buffer 100.

The multi-bus implementation described above is simple and cost effective. The chance of traffic congestion within serial buffer 100 is reduced, thereby optimizing system performance.

Although the present invention has been described in connection with several embodiments, it is understood that this invention is not limited to the embodiments disclosed, but is capable of various modifications which would be apparent to one of ordinary skill in the art. Thus, the invention is limited only by the following claims.

We claim:
1. A serial buffer comprising: a plurality of queues;
a plurality of configuration registers;
a parser coupled to receive incoming packets;
a first processing path coupled to receive packets of a first packet type from the parser, wherein the first processing path comprises slave read circuitry for performing slave read accesses on read ports of the plurality of queues in response to packets of the first packet type; and
a second processing path coupled to receive packets of a second packet type from the parser, wherein the second processing path comprises register access circuitry for accessing the configuration registers in response to packets of the second packet type;
a memory access engine that implements bus master read accesses on the read ports of the plurality of queues in response to fullness levels of the plurality of queues; and
egress control logic that routes data read from the configuration registers in response to packets of the second packet type with a higher priority than data read from the plurality of queues by the slave read accesses and the bus master read accesses.

2. The serial buffer of claim 1, wherein the first packet type has a first average processing time and the second packet type has a second average processing time, wherein the first average processing time is greater than the second average processing time.

3. The serial buffer of claim 1, further comprising:
a first input buffer configured to receive and store packets of the first packet type, which are provided to the first input buffer from the parser; and
a second input buffer configured to receive and store packets of the second packet type, which are provided to the second input buffer from the parser.

4. The serial buffer of claim 1, further comprising an output bus, wherein the egress control logic routes data read from the configuration registers and data read from the plurality of queues to the output bus, wherein the data read from the configuration registers is routed to the output bus without interference from the data read from the read ports of the plurality of queues.

5. The serial buffer of claim 1, wherein the plurality of configuration registers control operation of the serial buffer.

6. The serial buffer of claim 1, wherein some of the bus master read accesses block some of the slave read accesses, and vice versa.

7. The serial buffer of claim 1, wherein the first processing path operates in parallel with the second processing path, whereby the slave read accesses and the bus master read accesses do not interfere with the accesses to the configuration registers.

8. The serial buffer of claim 1, further comprising a third processing path coupled to receive packets of a third packet type from the parser, wherein the third processing path comprises write circuitry for performing write operations on write ports of the plurality of queues in response to packets of the third packet type.

9. The serial buffer of claim 8, wherein the write ports of the plurality of queues are separate from the read ports of the plurality of queues, whereby the write operations are performed in parallel with, and without interference from, the slave read accesses and the bus master read accesses.

10. The serial buffer of claim 8, wherein the first, second and third processing paths operate in parallel, whereby the slave read accesses and the bus master read accesses do not interfere with the accesses to the configuration registers or the write operations.

11. The serial buffer of claim 1, wherein a processing time associated with accessing the configuration registers is shorter than a processing time associated with performing the slave read accesses and the bus master read accesses.

12. A method of operating a serial buffer comprising:
receiving an incoming packet stream having a plurality of different packet types;

separating packets of the incoming packet stream based on the packet types;

processing packets of a first packet type in a first processing path of the serial buffer by performing slave read accesses on read ports of a plurality of queues of the serial buffer;

processing packets of a second packet type in a second processing path of the serial buffer by accessing configuration registers of the serial buffer;

initiating bus master read accesses on the read ports of the plurality of queues in response to fullness levels of the plurality of queues; and routing data read from the configuration registers and data read from the plurality of queues to an outgoing bus, wherein the data read from the configuration registers is routed without interference from the data read from the plurality of queues.

13. The method of claim 12, further comprising processing packets of a third packet type in a third processing path of the serial buffer by performing write operations on write ports of the plurality of queues.

14. The method of claim 13, further comprising performing the write operations in parallel with, and without interference from, the slave read accesses and the bus master read accesses.

15. The method of claim 13, wherein the first, second and third processing paths operate in parallel, whereby the slave read accesses and the bus master read accesses do not interfere with the accesses to the configuration registers or the write operations.

16. The method of claim 12, further comprising controlling operations of the serial buffer in response to contents of the configuration registers.

17. The method of claim 12, wherein some of the bus master read accesses block some of the slave read accesses, and vice versa.

18. The method of claim 12, wherein the first processing path operates in parallel with the second processing path, and the slave read accesses and the bus master read accesses do not interfere with the accesses to the configuration registers.

19. The method of claim 12, wherein a processing time associated with accessing the configuration registers is shorter than a processing time associated with performing the slave read accesses and the bus master read accesses.

* * * * *